United States Patent
Griffin et al.

(10) Patent No.: US 9,477,321 B2
(45) Date of Patent: Oct. 25, 2016

(54) EMBEDDED NAVIGATION ASSEMBLY AND METHOD ON HANDHELD DEVICE

(75) Inventors: Jason T. Griffin, Kitchener (CA); Steven Fyke, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 1293 days.

(21) Appl. No.: 11/966,190

(22) Filed: Dec. 28, 2007

(65) Prior Publication Data

US 2009/0167695 A1 Jul. 2, 2009

(51) Int. Cl.
*G06F 3/02* (2006.01)
*G06F 1/16* (2006.01)
*G06F 3/038* (2013.01)
*G06F 3/041* (2006.01)
*H04M 1/23* (2006.01)

(52) U.S. Cl.
CPC .......... *G06F 3/0213* (2013.01); *G06F 1/169* (2013.01); *G06F 1/1626* (2013.01); *G06F 1/1662* (2013.01); *G06F 3/038* (2013.01); *G06F 3/0414* (2013.01); *H04M 1/23* (2013.01); *H04M 2250/70* (2013.01)

(58) Field of Classification Search
USPC ................. 345/160, 168–172, 173–178
See application file for complete search history.

(56) References Cited

U.S. PATENT DOCUMENTS

| | | | |
|---|---|---|---|
| 5,666,113 A | 9/1997 | Logan | |
| 5,917,906 A | 6/1999 | Thornton | |
| 6,809,724 B1 * | 10/2004 | Shiraishi et al. | 345/169 |
| 7,206,599 B2 * | 4/2007 | Lemley | G06F 3/0238 341/21 |
| 7,274,353 B2 * | 9/2007 | Chiu et al. | 345/156 |
| 2004/0212597 A1 * | 10/2004 | Nuovo et al. | 345/168 |
| 2005/0024240 A1 * | 2/2005 | Fyke et al. | 341/22 |
| 2007/0091070 A1 * | 4/2007 | Larsen et al. | 345/168 |
| 2007/0247433 A1 | 10/2007 | Li | |
| 2007/0273655 A1 * | 11/2007 | Yeh et al. | 345/169 |
| 2007/0294636 A1 * | 12/2007 | Sullivan | 715/810 |
| 2008/0106519 A1 * | 5/2008 | Murray | 345/169 |

FOREIGN PATENT DOCUMENTS

| | | |
|---|---|---|
| EP | 1081922 | 3/2001 |
| EP | 1179767 | 2/2002 |

OTHER PUBLICATIONS

Extended European Search Report dated Apr. 29, 2008. In corresponding application No. 07124138.4.

Notice of Allowance and Fee(s) Due dated Sep. 18, 2009. In corresponding application No. 07124138.4.

* cited by examiner

*Primary Examiner* — Amr Awad
*Assistant Examiner* — Stephen Bray
(74) *Attorney, Agent, or Firm* — Thomas S. Grzesik; Fleit Gibbons Gutman Bongini & Bianco PL (57) ABSTRACT

A handheld electronic communication device includes a plurality of text entry keys arranged in a keyfield. A navigation home region includes a navigation home key, and a navigation travel region bounds the navigation home region. The navigation travel region overlies text entry keys within the keyfield. A user navigates by actuating the navigation home key and then moving his finger across keys lying within the navigation travel region and otherwise generally used to effect text entry into the device. The navigation home key is preferably configured for dual levels of actuation, as may be the text entry keys.

21 Claims, 7 Drawing Sheets

EMBEDDED NAVIGATION ASSEMBLY AND METHOD ON HANDHELD DEVICE

FIELD

This disclosure, in a broad sense, is directed toward a handheld communication device that has wireless communication capabilities and the networks within which the wireless communication device operates. More particularly, the disclosure relates to apparatus and methodology for navigating through the graphical user interface of the device.

BACKGROUND

With the proliferation of wireless communication systems, compatible handheld communication devices are becoming more prevalent, as well as advanced. Whereas in the past such handheld communication devices were typically limited to either voice transmission (cell phones) or text transmission (pagers and PDAs), today's consumer often demands a multifunctional device capable of performing both types of transmissions, including even sending and receiving e-mail. Furthermore, these higher-performance devices can also be capable of sending and receiving other types of data including that which allows the viewing and use of Internet websites. These higher level functionalities necessarily require greater user interaction with the devices through included user interfaces (UIs) which may have originally been designed to accommodate making and receiving telephone calls and sending messages over a related Short Messaging Service (SMS). As might be expected, suppliers of such mobile communication devices and the related service providers are anxious to meet these customer requirements, but the demands of these more advanced functionalities have in many circumstances rendered the traditional user interfaces unsatisfactory, a situation that has caused designers to have to improve the UIs through which users input information and control these sophisticated operations.

Keyboards are used on many handheld devices, including telephones and mobile communication devices. The size of keyboards has been reduced over the years, as newer, smaller devices have become popular. Cell phones, for example, are now sized to fit in one's pocket or the palm of the hand. As the size of the devices has decreased, the more important it has become to utilize the entire keyboard surface as efficiently as possible.

Many keyboards on mobile devices have an input device for navigation through the graphical user interface. Interfaces include such devices as trackballs and rotating wheels which can be used to effect movement of a cursor or pointer, or to scroll up, down and about a displayed page. These navigation devices often occupy a relatively large amount of space on the incorporating mobile device. Because the navigation device is frequently used and often requires fine control, a lower end size limitation will normally be observed by device designers. To accommodate such larger, more convenient navigation devices on the housing of the mobile device, the amount of space that is available for the keys of the keyboard is correspondingly reduced if the keyboard and navigational device are proximately located to one another.

Current solutions for cursor navigation and textual input require a substantial portion of the front face of a handheld electronic device to be dedicated to these input means while detracting from the space available for the display screen. It is therefore desirable to configure a handheld electronic device so that the space required for the input devices are minimized and user control of the on screen cursor is improved.

BRIEF DESCRIPTION OF THE DRAWINGS

Examplary methods and arrangements conducted and configured according to the advantageous solutions presented herein are depicted in the accompanying drawings wherein.

DETAILED DESCRIPTION

Figure 1:
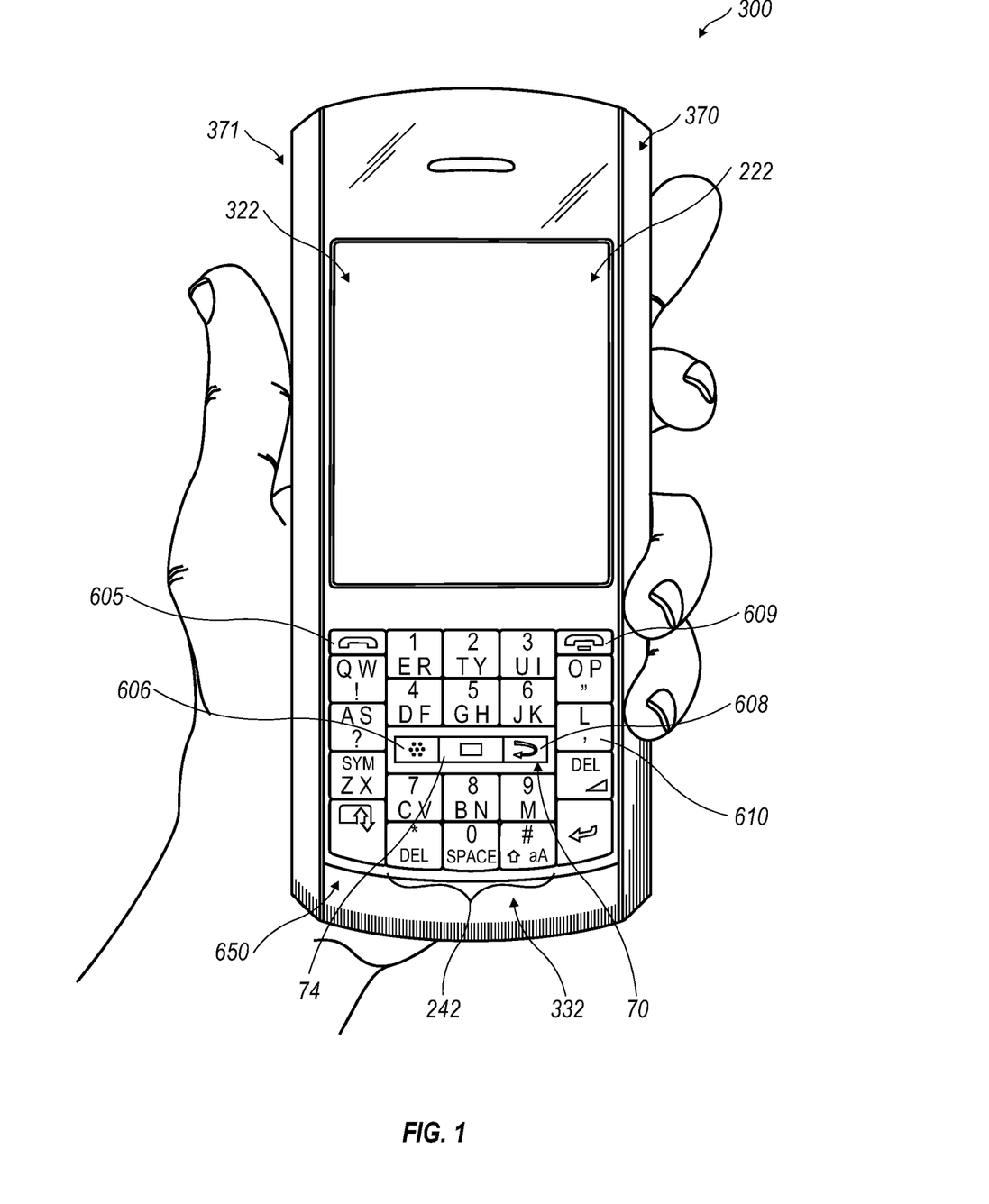
FIG. 1 illustrates a handheld wireless communication device configured according to the present teachings cradled in the palm of a user's hand.
Figure 2:
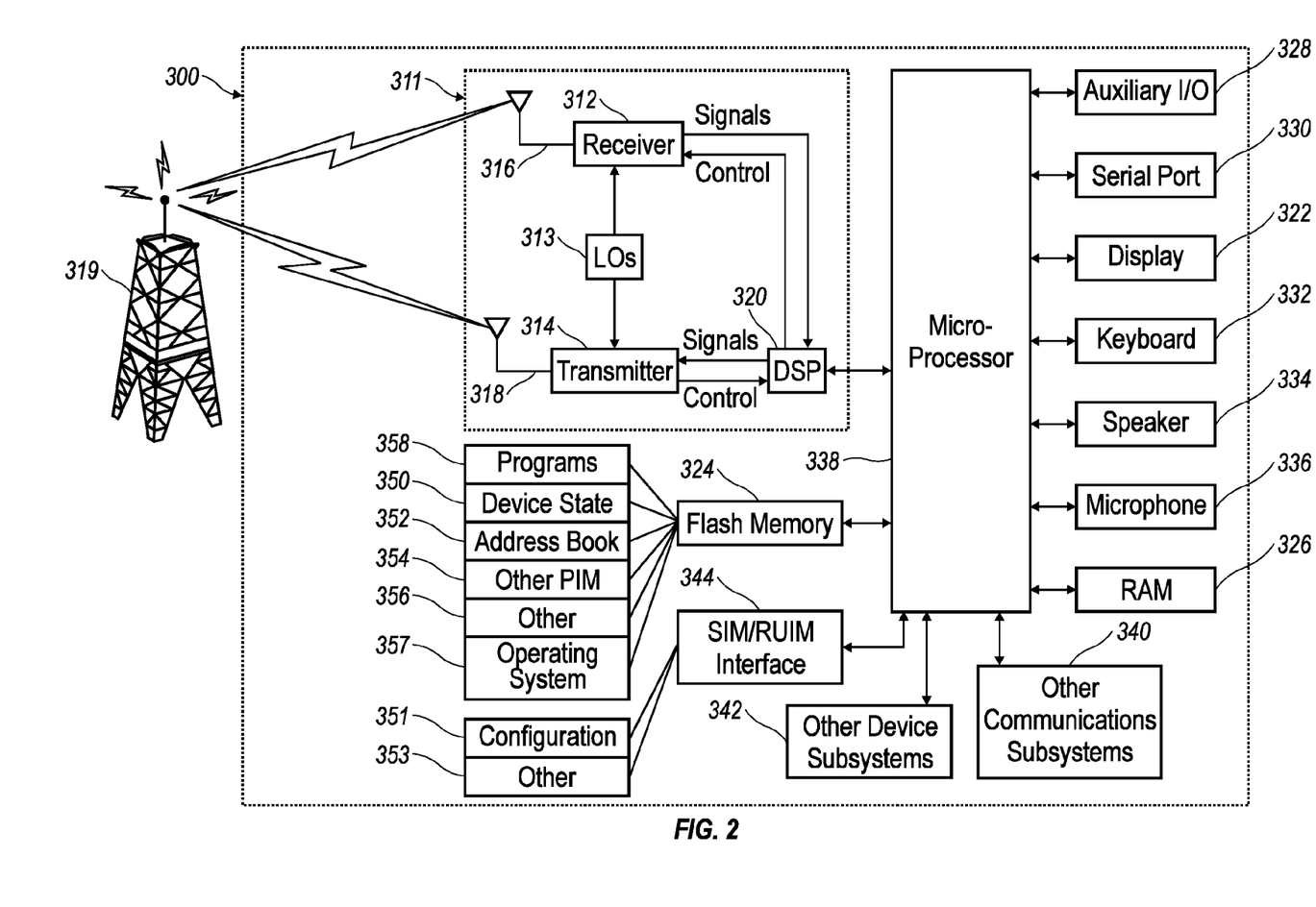
FIG. 2 is a block diagram representing a wireless handheld communication device interacting in a communication network.

An examplary handheld wireless communication device 300 is shown in FIG. 1, and the device's cooperation in a wireless network 319 is exemplified in the block diagram of FIG. 2. These figures are examplary only, and those persons skilled in the art will appreciate the additional elements and modifications necessary to make the device 300 work in particular network environments.

As shown in the block diagram of FIG. 2, the handheld device 300 includes a microprocessor 338 that controls the operation of the device 300. A communication subsystem 311 performs all communication transmission and reception with the wireless network 319. The microprocessor 338 further connects with an auxiliary input/output (I/O) subsystem 328, a serial port (preferably a Universal Serial Bus port) 330, a display 322, a keyboard 332, a speaker 334, a microphone 336, random access memory (RAM) 326, and flash memory 324. Other communication subsystems 340 and other device subsystems 342 are generally indicated as being functionally connected with the microprocessor 338 as well. An example of a communication subsystem 340 is that of a short range communication system such as BLUETOOTH® communication module or a Wi-Fi communication module (a communication module in compliance with IEEE 802.11b) and associated circuits and components. Additionally, the microprocessor 338 is able to perform operating system functions and preferably enables execution of software applications on the handheld wireless communication device 300. Furthermore, the microprocessor 338 is communicatively interposed between alphabetic keys of the keyboard 332 and a display screen of the display area 322, and is configured to receive text input instructions via the alphabetic keys of the keyboard area and to display corresponding text on the display screen of the display area 322.

Figure 1A:
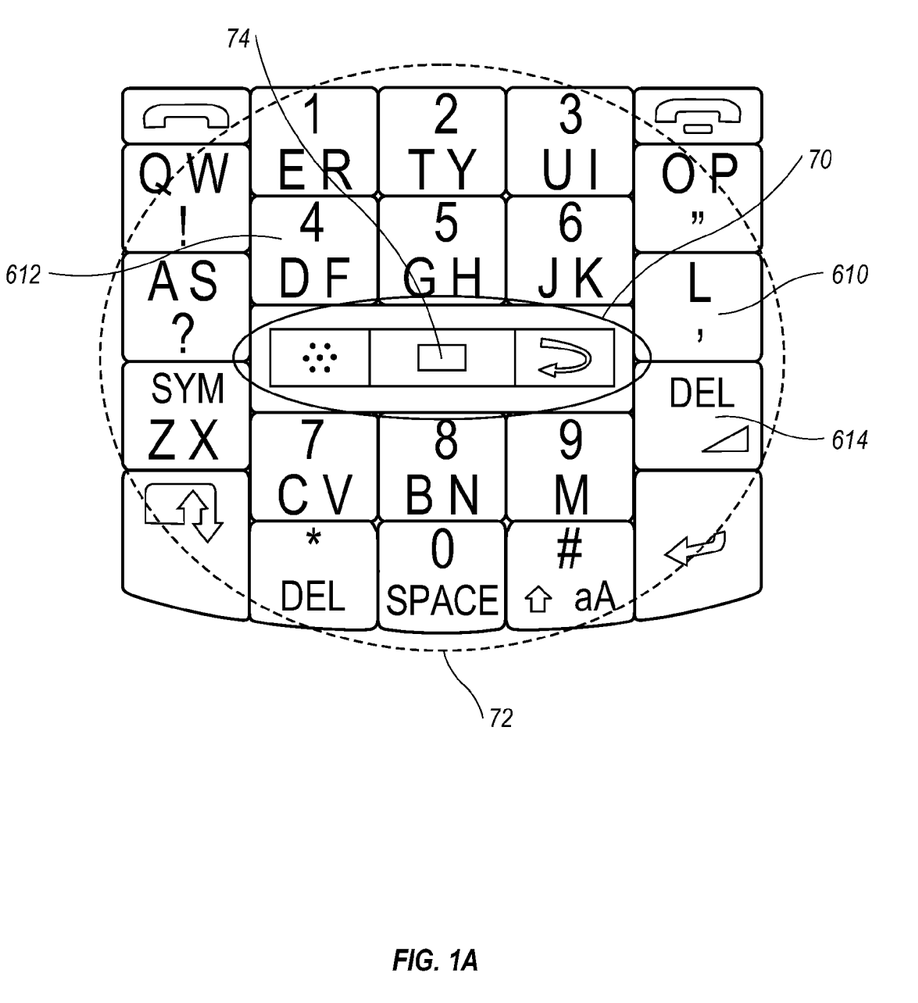
FIG. 1A is a close-up of the keyfield employed on the device illustrated in FIG. 1.

As will be explained more fully below, the auxiliary input system 328 according to this disclosure is embedded in that it shares space with and overlaps the keyfield area 650 generally used for text entry, as illustrated in FIGS. 1 and 1A. The auxiliary input system has a navigation initiation zone 70 from which navigation is initiated and a cursor navigation area 72 through which the user moves his finger to control motion of a cursor, pointer, icon, menu highlighting or the like across the display screen 322 of the device 300. The navigation initiation zone 70 is bounded by coincidentally located alphabetic keys 610 of the keyfield area 650 and the cursor navigation area 72. The navigation initiation zone 70 includes a navigation initiation key 74, but may also include other navigation-related buttons such as a menu key 606 and an escape or back key 608 to facilitate interaction with the device if so desired. The cursor navigation area 72 bounds the navigation initiation zone 70 and overlies a number of the alphabetic keys 610 of the keyfield area 650 on the device 300. Thus, the user navigates by dragging his fingertip over the keys of the keyfield area 650 that are otherwise—generally, as referenced above—used for text entry. The user initiates navigation by actuating the navigation initiation key 74; this indicates to the device microprocessor 338 that the user is navigating, as opposed to moving between keys while typing, and ensures that subsequent pressure on or depression of keys of the keyfield area 650 is interpreted as part of the navigational input instead of textual input. The microprocessor 338 is programmed to interpret cursor guidance instructions from the sweeping contact motion that is initiated at the navigation initiation zone 70. As the sweeping motion continues across the cursor navigation area 72, the microprocessor 338 is configured to receive cursor guidance instructions via the cursor navigation area 72 and to cause corresponding cursor movement on the display screen 322 of the display area 222. Furthermore, the microprocessor 338 is programmed to interpret text input instructions from contact that initiates at an alphabetic key 610. The device can be configured such that navigation is terminated in a variety of ways, including by pressing the navigation initiation key 74 a second time; by pressing a text key a certain number of times in a row (for example, two or three times); or by a time-out after a predetermined period of time (for example, two seconds) of no activation of the keyfield area 650.

In another exemplary embodiment, keys within the navigation initiation zone 70 may utilize a surface treatment on the key surface such that the top surface of the key is distinctive from the surface of other keys and which is tactilely perceptible. The surface treatments will be indicative of the permissible directions in which cursor guidance can initiate. In one embodiment, the indicated permissible directions include horizontal and vertical. In yet another embodiment, the indicated permissible directions include horizontal, vertical and diagonal directions. In yet another embodiment, the indicated permissible directions can include those listed above as well as other directions.

Figure 8:
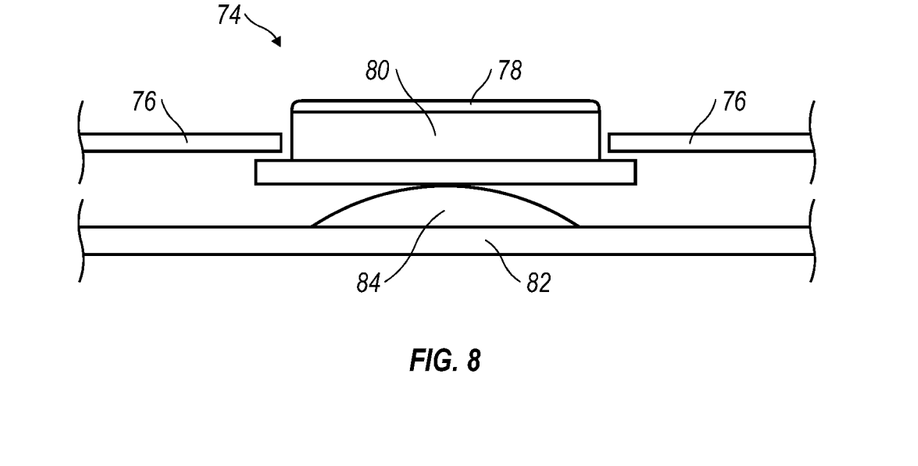
FIG. 8 is a schematic section view of a key configured to have dual input functionality.

Suitably, the navigation initiation key 74, in one example illustrated in FIG. 8, is an actual or physical key configured for two levels of functionality. In particular, it may be configured with both "soft-press" attributes and "hard-press" attributes. The soft-press mode of actuation would be used to initiate navigation, whereas the hard-press mode of actuation would be used to make other entries into the device 300 (for example, to select a menu option, highlighted icon, and the like). The soft-press functionality can be provided by making the navigation initiation key 74 contact-sensitive, for example, through the use of a capacitance detector or a surface acoustic wave detector on its upper surface or through the use of pressure sensors which can sense the application of pressure to the navigation initiation key 74 in any direction. The hard-press functionality, on the other hand, can be provided by means of a dome switch located below the navigation initiation key 74. (Such dual functionality likely would not be present on a "virtual" or image-type navigation initiation key 74 that could be employed on devices using one or more LCD's to present to the user—at least when the device is turned on—the keyfield area 650 as well as the main user interface display screen 322; in that case, functionality of the navigation initiation "button" would be limited to initiating navigation.)

Similarly, depending on their basic construction (particularly in the case of physical keys), the keys of the keyfield area 650, may be configured with dual means of actuation— one means of actuation being provided to effect navigation and the other means of actuation being provided to effect text entry. For example, like a physical navigation initiation key, the keyfield keys may have both soft-press functionality for navigation (provided, for example, by capacitance or surface acoustic wave detectors or pressure sensors) and hard-press functionality for text entry (provided, for example, by dome switches). In that case, pressing the navigation initiation key 74 in the manner that activates device navigation indicates to the handheld device 300 which of the two keyfield input modalities to be activated or recognized. Alternatively, the keys of the keyfield area 650 may be constructed with just a single input modality. For example, the keys may be flush with the surface of the handheld device 300 and register that they are being pressed by capacitance or surface wave detectors, or they may be "virtual" keys that are presented to the user on an LCD display. In that case, pressing the navigation initiation key 74 in the manner that activates device navigation indicates to the handheld device 300 how to interpret the input signal from the keys of the keyfield area 650—for example, whether the user is navigating the display area 222 the handheld device 300 or making a textual entry into the handheld device 300. Additionally the navigation initiation key 74 may have a contact-sensitive top surface that is physically depressible.

Figure 6:
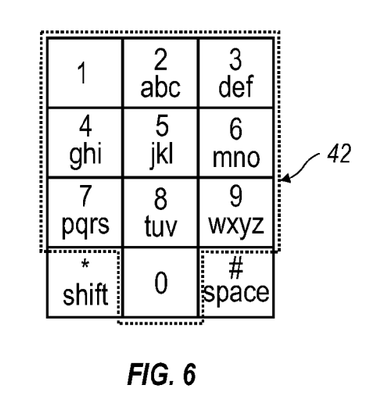
FIG. 6 illustrates a traditional or standard phone key arrangement or layout according to the ITU Standard E.161 including both numerals and letters.

As may be appreciated from FIG. 1, one embodiment of a handheld wireless communication device 300 comprises a lighted display 322 located above a keyboard 332 constituting a user input and suitable for accommodating both textual input and navigational input to the handheld wireless communication device 300. The front face 370 of the device 300 has a navigation initiation zone 70 and an at least partially surrounding the keyfield 650. The keyfield 650 may, as shown in FIGS. 1 and 1a, include alphabetic 610, alphanumeric 612, and other function keys 614. The keys of the keyfield area 650 may be physically depressible. Moreover, as shown in FIGS. 1 and 1a, the alphabetic may be of a reduced keyboard design, in which multiple letters are associated with at least some of the keys. Alternatively, the alphabetic keys 610 and alphanumeric keys 612 may be of a full keyboard design, in which only one letter is associated with any given key. Regardless, however, of whether the keyboard is of a reduced or full configuration, the order of the letters of the alphabetic keys 610 or alphanumeric keys 612 on the presently disclosed handheld device 300 can be described as being of a traditional, but non-ITU Standard E.161 layout. This terminology has been utilized to delineate the fact that such a telephone keypad as depicted in FIG. 6 may not allow for efficient text entry on the handheld device 300.

The handheld wireless communication device 300 is also configured to send and receive voice communications such as mobile telephone calls. To facilitate telephone calls, two call keys 605, 609 are provided. One of the two call keys is a call initiation key 605, and the other is a call termination key 609. In the navigation initiation zone 70, the menu key 606 is used to bring up a menu on the display screen 322 and the back or escape key 608 is used to return to the previous screen or previous menu selection. The functions of the call keys 605, 609 and the menu keys 606, 608 may, of course, be provided by buttons that are located elsewhere on the handheld device 300.

Furthermore, the handheld device 300 is equipped with components to enable operation of various programs, as shown in FIG. 2. In an examplary embodiment, the flash memory 324 is enabled to provide a storage location for the operating system 357, device programs 358, and data. The operating system 357 is generally configured to manage other application programs 358 that are also stored in memory 324 and executable on the processor 338. The operating system 357 honors requests for services made by application programs 358 through predefined application program 358 interfaces. More specifically, the operating system 357 typically determines the order in which multiple applications 358 are executed on the processor 338 and the execution time allotted for each application 358, manages the sharing of memory 324 among multiple applications 358, handles input and output to and from other device subsystems 342, and so on. In addition, users can typically interact directly with the operating system 357 through a user interface usually including the keyboard 332 and display screen 322. While in an examplary embodiment the operating system 357 is stored in flash memory 324, the operating system 357 in other embodiments is stored in read-only memory (ROM) or similar storage element (not shown). As those skilled in the art will appreciate, the operating system 357, device application 358 or parts thereof may be loaded in RAM 326 or other volatile memory.

In one examplary embodiment, the flash memory 324 contains programs/applications 358 for execution on the handheld device 300 including an address book 352, a personal information manager (PIM) 354, and the device state 350. Furthermore, programs 358 and other information 356 including data can be segregated upon storage in the flash memory 324 of the handheld device 300.

When the handheld device 300 is enabled for two-way communication within the wireless communication network 319, it can send and receive signals from a mobile communication service. Examples of communication systems enabled for two-way communication include, but are not limited to, the General Packet Radio Service (GPRS) network, the Universal Mobile Telecommunication Service (UMTS) network, the Enhanced Data for Global Evolution (EDGE) network, and the Code Division Multiple Access (CDMA) network and those networks, generally described as packet-switched, narrowband, data-only technologies which are mainly used for short burst wireless data transfer. For the systems listed above, the handheld wireless communication device 300 must be properly enabled to transmit and receive signals from the communication network 319. Other systems may not require such identifying information. GPRS, UMTS, and EDGE require the use of a Subscriber Identity Module (SIM) in order to allow communication with the communication network 319. Likewise, most CDMA systems require the use of a Removable Identity Module (RUIM) in order to communicate with the CDMA network. The RUIM and SIM card can be used in multiple different communication devices 300. The handheld communication device 300 may be able to operate some features without a SIM/RUIM card, but it will not be able to communicate with the network 319. A SIM/RUIM interface 344 located within the device 300 allows for removal or insertion of a SIM/RUIM card (not shown). The SIM/RUIM card features memory and holds key configurations 351, and other information 353 such as identification and subscriber related information. With a properly enabled communication device 300, two-way communication between the handheld wireless communication device 300 and communication network 319 is possible.

If the handheld wireless communication device 300 is enabled as described above or the communication network 319 does not require such enablement, the two-way communication enabled handheld device 300 is able to both transmit and receive information from the communication network 319. The transfer of communication can be from the handheld device 300 or to the device 300. In order to communicate with the communication network 319, the handheld device 300 in the presently described examplary embodiment is equipped with an integral or internal antenna 318 for transmitting signals to the communication network 319. Likewise the handheld wireless communication device 300 in the presently described examplary embodiment is equipped with another antenna 316 for receiving communication from the communication network 319. These antennae (316, 318) in another examplary embodiment are combined into a single antenna (not shown). As one skilled in the art would appreciate, the antenna or antennae (316, 318) in another embodiment are externally mounted on the handheld device 300.

When equipped for two-way communication, the handheld wireless communication device 300 features a communication subsystem 311. As is well known in the art, this communication subsystem 311 is modified so that it can support the operational needs of the handheld device 300. The subsystem 311 includes a transmitter 314 and receiver 312 including the associated antenna or antennae (316, 318) as described above, local oscillators (LOs) 313, and a processing module 320 which in the presently described examplary embodiment is a digital signal processor (DSP) 320.

It is contemplated that communication by the handheld device 300 with the wireless network 319 can be any type of communication that both the wireless network 319 and handheld device 300 are enabled to transmit, receive and process. In general, these can be classified as voice and data. Voice communication is communication in which signals for audible sounds are transmitted by the handheld device 300 through the communication network 319. Data is all other types of communication that the handheld device 300 is capable of performing within the constraints of the wireless network 319.

Example device applications that can depend on such data include email, contacts and calendars. For each such application synchronization with home-based versions on the applications can be critical for either or both of their long term and short term utility. As an example, emails are often time sensitive, so substantially real time synchronization is highly desirable. Contacts, on the other hand, can be usually updated less frequently without inconvenience. Therefore, the utility of the handheld device 300 is significantly enhanced (if not enabled) when connectable within a communication system, and particularly when connectable on a wireless basis in a network 319 in which voice, text messaging, and other data transfer are accommodated.

As intimated hereinabove, one of the more important aspects of the handheld wireless communication device 300 to which this disclosure is directed is its size. While some users will grasp the handheld device 300 in both hands, it is intended that a predominance of users will cradle the handheld device 300 in one hand in such a manner that input and control over the handheld device 300 can be effected using the thumb of the same hand in which the handheld device 300 is held. However, it is appreciated that additional control can be effected by using both hands. As a handheld device 300 that is easy to grasp and desirably pocketable, the size of the handheld device 300 must be kept commensurately small. Of the device's dimensions, limiting its width is important for the purpose of assuring cradleability in a user's hand. Moreover, it is preferred that the width of the handheld device 300 be maintained at less than eight centimeters (approximately three inches). Keeping the handheld device 300 within these dimensional limits provides a hand cradleable unit that users prefer for its usability and portability. Limitations with respect to the height (length) of the handheld device 300 are less stringent when considering hand-cradleability. Therefore, in order to gain greater size, the handheld device 300 can be advantageously elongated so that its height is greater than its width, but still remains easily supported and operated in one hand.

A potential drawback is presented by the small size of the handheld device 300 in that there is limited exterior surface area for the inclusion of user input and device output features. This is especially true for the "prime real estate" on the front face 370 of the handheld device 300, where it is most advantageous to include a display screen 322 that outputs information to the user. The display screen 322 is preferably located above a keyboard 332 that is utilized for data entry into the handheld device 300 by the user. If the screen 322 is provided below the keyboard 332, a problem occurs in that viewing the screen 322 is inhibited when the user is inputting data using the keyboard 332. Therefore it is preferred that the display screen 322 be above the input area, thereby solving the problem by assuring that the hands and fingers do not block the view of the screen 322 during data entry periods.

To facilitate textual data entry into the handheld device 300, an alphabetic keyboard 332 is provided. In the exemplary illustrated embodiment, a reduced format alphabetic keyboard 332 is utilized in which there are multiple letters associated with at least some of the keys (with some of the letter keys also having numbers, symbols, or functions associated with them). In this regard, the letter indicia associated with the alphabetic keys can be advantageously organized in QWERTY, QWERTZ, AZERTY, or Dvorak layouts, among others, thereby capitalizing on certain users' familiarity with these various letter orders. An exemplary arrangement is shown in FIGS. 1 and 1*a*, where indicia for the letter Q is located above the navigation initiation zone 70 on the front face of the body of the device and the indicia for the letter M is located below the navigation initiation zone 70 on the front face 370 of the body of the device 300.

As shown in FIG. 1, the handheld wireless communication device 300 is cradleable in the palm of a user's hand. The handheld device 300 is provided with a keyboard 332 to enter text data and place telephone calls and a display screen 322 for communicating information to the user. A connect/send key 605 is preferably provided to aid in the placement of a phone call. Additionally, a disconnect/end key 609 is provided. The send key 605 and end key 609 preferably are located at the upper left and right corners of the keyfield, as shown, although many other locations may be utilized.

The keyboard 332 includes a plurality of keys that can be of a physically depressible nature such as actuable buttons, or they can be of a software nature, typically constituted by virtual representations of physical keys on a display screen 322 (referred to herein as "virtual keys"). It is also contemplated that the user input can be provided as a combination of the two types of keys. Each key of the plurality of keys has at least one actuable action which can be the input of a character, a command or a function. In this context, "characters" are contemplated to exemplarily include alphabetic letters, language symbols, numbers, punctuation, insignias, icons, pictures, and even a blank space. Input commands and functions can include such things as delete, backspace, moving a cursor up, down, left or right, initiating an arithmetic function or command, initiating a command or function specific to an application program or feature in use, initiating a command or function programmed by the user and other such commands and functions that are well known to those persons skilled in the art. Further, depending on the application 358 or feature in use, specific keys can be enabled or disabled.

In the case of physical keys, all or a portion of the plurality of keys have one or more indicia representing character(s), command(s), functions(s), or a combination including one or more of character(s), command(s), and function(s) displayed at on one or more of their top surface (as illustrated in FIGS. 1 and 1A) and on the surface of the area adjacent the respective key. In the instance where the indicia of a key's function is provided adjacent the key, the indicia can be printed on the device cover beside the key, or in the instance of keys located adjacent the display screen 322. Additionally, current indicia for the key may be temporarily shown nearby the key on the screen 322.

In the case of virtual keys, the indicia for the respective keys are shown on the display screen 322, which in one embodiment each virtual key has a contact-sensitive top surface and is enabled by touching the display screen 322, for example, with a stylus to generate the character or activate the indicated command or function. Some examples of display screens 322 capable of detecting a touch include resistive, capacitive, projected capacitive, infrared and surface acoustic wave (SAW) touchscreens.

Physical and virtual keys can be combined in many different ways as appreciated by those skilled in the art. In one embodiment, physical and virtual keys are combined such that the plurality of enabled keys for a particular application or feature of the handheld wireless communication device 300 is shown on the display screen 322 in the same configuration as the physical keys. Using this configuration, the user can select the appropriate physical key corresponding to what is shown on the display screen 322. Thus, the desired character, command or function is obtained by depressing the physical key corresponding to the character, command or function displayed at a corresponding position on the display screen 322, rather than touching the display screen 322.

Figure 3A:
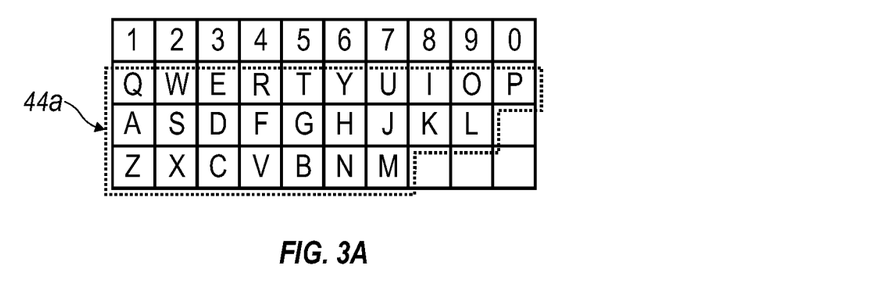
FIG. 3A illustrates an examplary QWERTY keyboard layout.
Figure 3B:
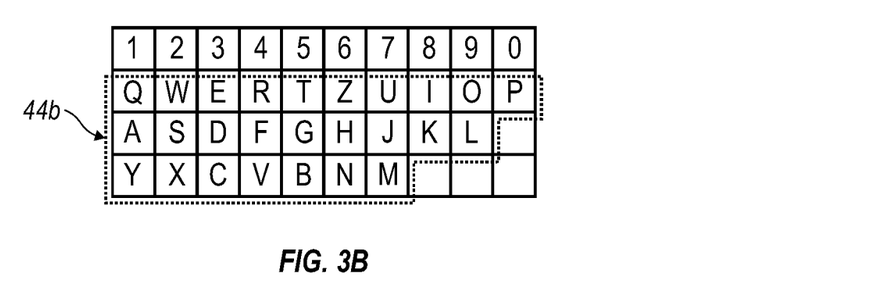
FIG. 3B illustrates an examplary QWERTZ keyboard layout.
Figure 3C:
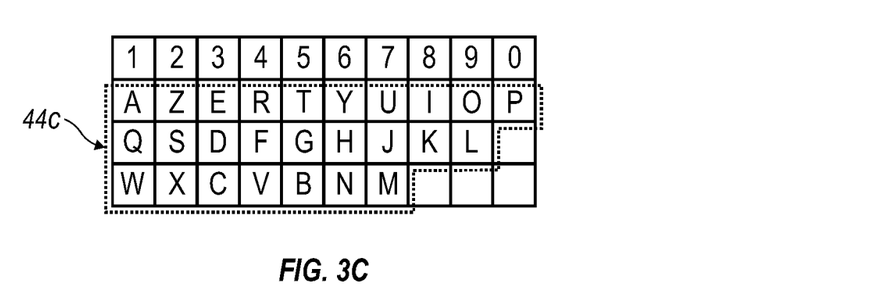
FIG. 3C illustrates an examplary AZERTY keyboard layout.
Figure 3D:
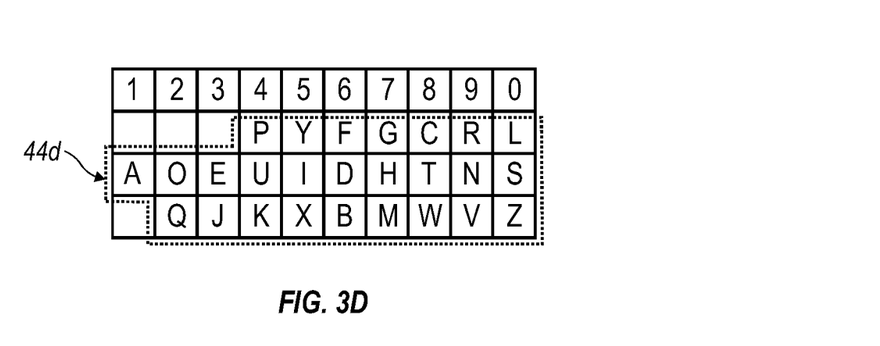
FIG. 3D illustrates an examplary Dvorak keyboard layout.

The various characters, commands, and functions associated with keyboard typing in general are traditionally arranged using various conventions. The most common of these in the United States, for instance, is the QWERTY keyboard layout. Others include the QWERTZ, AZERTY, and Dvorak keyboard configurations. The QWERTY keyboard layout is the standard English-language alphabetic key arrangement 44a shown in FIG. 3a and is employed in the exemplary embodiment illustrated in FIG. 1. The QWERTZ keyboard layout is normally used in German-speaking regions; this alphabetic key arrangement 44b is shown in FIG. 3b. The AZERTY keyboard layout 44c is normally used in French-speaking regions and is shown in FIG. 3c. The Dvorak keyboard layout was designed to allow typists to type faster; this alphabetic key arrangement 44d is shown in FIG. 3d. In other examplary embodiments, keyboards having multi-language key arrangements can be implemented.

Figure 4:
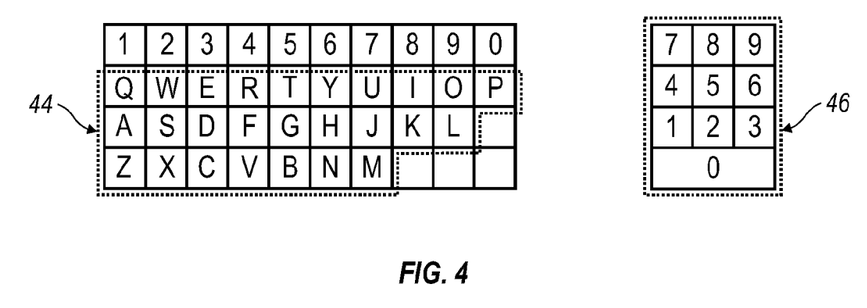
FIG. 4 illustrates a QWERTY keyboard layout paired with a traditional ten-key keyboard.

Alphabetic key arrangements are often presented along with numeric key arrangements. Typically, the numbers 1-9 and 0 are positioned in the row above the alphabetic keys 44a-d, as shown in FIG. 3a-d. Alternatively, the numbers share keys with the alphabetic characters, such as the top row of the QWERTY keyboard. Yet another examplary numeric key arrangement is shown in FIG. 4, where a "ten-key" style numeric keypad 46 is provided on a separate set of keys that is spaced from the alphabetic/numeric key arrangement 44. Further, a split numeric phone key arrangement 242 is exemplarily illustrated in FIGS. 1 and 1a, where the numbers 1-3 and 4-6 are located in rows above the navigation initiation zone 70 and the numbers 7-9 and 0 are located in rows blow the navigation initiation zone 70.

Figure 5:
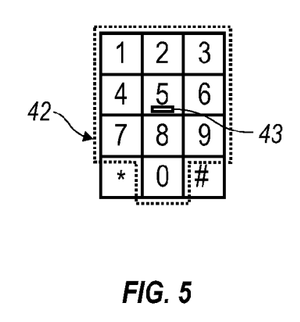
FIG. 5 illustrates ten digits comprising the numerals 0-9 arranged in a traditional, ITU Standard E.161 numeric telephone keypad layout, including the * and # keys flanking the 0 key.

As shown in FIG. 5, the numeric phone key arrangement 42 may also utilize a surface treatment on the surface of the "5" key. This surface treatment is configured such that the top surface of the key is distinctive from the surface of other keys. Preferably the surface treatment is in the form of a raised bump or recessed dimple 43. Alternatively, raised bumps may be positioned on the housing 76 around the "5" key and do not necessarily have to be positioned directly on the key.

It is desirable for handheld devices 300 to include a combined text-entry keyboard and a telephony keyboard, as illustrated in FIGS. 1 and 1a. Examples of such handheld devices 300 include mobile stations, cellular telephones, wireless personal digital assistants (PDAs), two-way paging devices, and others. Various keyboard arrangements can be used with such devices and can be termed a full keyboard, a reduced-format keyboard (as illustrated), or phone key pad. In embodiments of a handheld device 300 having a full keyboard, the alphabetic characters are singly associated with the plurality of physical keys. Thus, in an English-language keyboard of this configuration, there would be at least 26 keys in the plurality, with one letter per alphabetic key.

FIGS. 5 and 6 both feature numeric keys arranged according to the ITU Standard E.161 form. In addition, FIG. 6 also incorporates alphabetic characters according to the ITU Standard E.161 layout as well. The International Telecommunications Union ("ITU") has established phone standards for the arrangement of alphanumeric keys. The standard phone numeric key arrangement shown in FIGS. 5 (no alphabetic letters) and 6 (with alphabetic letters) corresponds to ITU Standard E.161, entitled "Arrangement of Digits, Letters, and Symbols on Telephones and Other Devices That Can Be Used for Gaining Access to a Telephone Network." This standard is also known as ANSI TI.703-1995/1999 and ISO/IEC 9995-8:1994. As shown in FIGS. 1 and 1a, the numeric key arrangement can be overlaid on a QWERTY arrangement. The numeric arrangement as shown can be aptly described as a top-to-bottom ascending order three-by-three-over-zero pattern.

While several keyboard layouts have been described above, the layouts can be described as having keys disposed on the keyboard in a QWERTY, reduced QWERTY, QWERTZ, Dvorak, or AZERTY key layout. These familiar keyboard layouts allow users to type more intuitively and quickly than, for example, on the standard alphabetic layout on a telephone pad. As mentioned above, the key arrangements can be reduced compared to a standard layout through the use of more than one letter or character per key. By utilizing fewer keys, the keys can be made larger and therefore more convenient to the user.

Reverting now to a more detailed discussion of the focus of this disclosure, a preferred arrangement for navigating a handheld wireless device 300 is disclosed in FIGS. 1, 1a, and 7-8. As summarized above, a preferred keyboard arrangement includes a initiation zone 70 from which navigation is initiated and a cursor navigation area 72 through which the user moves his finger or other object or digit to control motion of a cursor, pointer, icon, menu highlighting or the like across the display screen 322. The navigation initiation zone 70 is bounded at least partially by the coincidentally located portions of the alphabetic keys 610 and cursor navigation area 72 and includes a navigation initiation key 74. The navigation initiation zone 70 may also include other navigation-related keys such as a menu key 606 and an escape or back key 608 to facilitate interaction with the device if so desired. In at least one embodiment, the navigation initiation zone 70 includes a physically depressible key 210, which may have a contact-sensitive top surface. The navigation initiation zone 70 may include a plurality of input keys, for example the menu 606, navigation initiation key 74, escape key 608 and other keys. This plurality of input keys within the navigation initiation zone 70 may also have contact-sensitive top surfaces. Additionally, the plurality of input keys can be a physically depressible key with a contact-sensitive top surface. Furthermore, in addition to initiating navigation, the navigation initiation zone 70 may also serve as a wakeup actuator for the cursor navigation area 72 from an energy-saving sleep mode.

The cursor navigation area 72 bounds the navigation initiation zone 70 and overlies a number of the text entry keyfield keys on the device. The cursor navigation area 72 is illustrated with broken lines to indicate that its bounds may vary in size, for example, depending on the application being run on the device, size of the keyfield area 650 and the like. Furthermore, the cursor navigation area 72 may completely surround the navigation initiation zone 70, as illustrated, although complete encirclement is not necessary for implementation of a device according to this disclosure. Rather, bounding—whether partial or total—is sufficient. In operation of the device 300, the user navigates by dragging his fingertip over the keys of the keyfield 650 that can be used for text entry. The user initiates navigation by actuating the navigation initiation key 74; this indicates to the device microprocessor 338 that the user is navigating, as opposed to just moving between keys while typing, and ensures that subsequent pressure on or depression of keyboard keys 332 is interpreted as part of the navigational input instead of text input.

As further noted above, the navigation initiation key 74 is suitably an actual or physical key (as opposed to a screen-presented depiction of a key) that is configured for dual levels of actuation. Such a configuration is illustrated in FIG. 8. As illustrated, the navigation initiation key 74 includes a contact-sensitive layer 78 on the upper surface of the body 80 of the key. The contact-sensitive layer 78 may be a capacitance sensor, a surface acoustic wave sensor, a pressure transducer, or any other suitable means for sensing when a user touches (and possibly applies light pressure to) the top of the navigation initiation key 74. Electrical leads (not shown) from the contact-sensitive layer 78 may extend through the body 80 of the key and connect to the printed circuit board 82 in suitable fashion. Furthermore, a dome switch 84 may be located on the printed circuit board 82 beneath the key 74 in known fashion. By pressing the key 74 sufficiently to collapse the dome switch 84, the user enters a second level of input into the device 300, for example, in a manner analogous to making a mouse click to make an entry or selection as noted above.

In the illustrated embodiment, the navigation initiation key 74 is dedicated to the navigation-initiation function. In alternate embodiments in which the navigation initiation key 74 is configured with dual modes of input, however, it could also function as a text entry key in addition to being used to initiate navigation.

Moreover, as noted above and particularly where they are physical or actual keys, the alphabetic keys 610 of keyfield area 650 may also be configured for dual input entry—one level of input being used for text entry and another level of input being used for navigation. There, the construction of the text entry keys of keyfield area 650 would be essentially the same as shown in FIG. 8 for the navigation initiation key 74. In that case, actuation of the navigation initiation key 74 in a manner that tells the device 300 the user is about to navigate renders the contact-sensitive portions of the keys of keyfield area 650 operable. Alternatively, if the keys of keyfield area 650 are configured for just a single mode of actuation—for example, if they include dome switches but no contact-sensitive upper surfaces or if they are virtual keys—actuation of the navigation initiation key 74 in a manner that tells the device 300 the user is about to navigate will cause the device 300 to interpret subsequent actuations of the alphabetic keys 610 of keyfield area 650 as indicating navigation around the device 300.

The arrangement and construction of the alphabetic keys 610 can be according to the above description. Furthermore, in at least one embodiment each of the alphabetic keys 610 is a physically depressible key. In yet another embodiment, each of the alphabetic keys 610 is a virtual key having a contact sensitive top surface. Additionally, the letter indicia associated with the alphabetic keys can be arranged in a QWERTY layout. In one example as illustrated in FIGS. 1 and 1A, the indicia for the letter Q is located above the navigation initiation zone 70 on the front face 370 of the body 371 of the device 300 and the indicia for the letter M is located below the navigation initiation zone 70 on the front face 370 of the body 371 of the handheld device 300.

Figure 7:
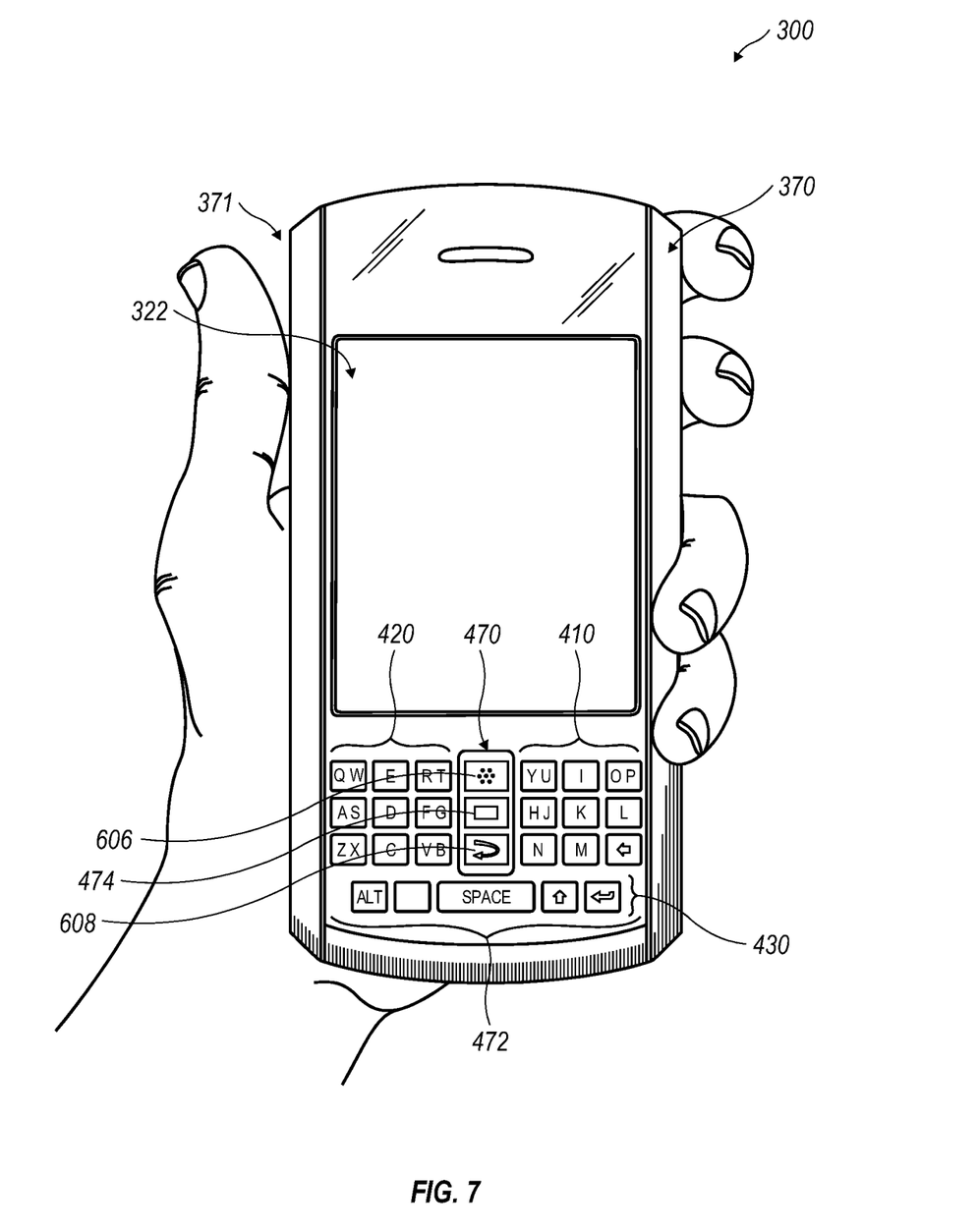
FIG. 7 is an alternative embodiment of keyfield employed on a handheld electronic communication device.

In another embodiment is presented in FIG. 7, which makes use of the above described keyboard arrangement including an initiation zone 470 from which navigation is initiated and a cursor navigation area 472 through which the user moves his finger or other object or digit to control motion of a cursor, pointer, icon, menu highlighting or the like across the display screen 322. The navigation initiation zone 470 is bounded at least partially by the coincidentally located portions of the alphabetic keys 410, 420 and cursor navigation area 472 and includes a navigation initiation key 474. The alphabetic keys are divided into a right zone of alphabetic keys 410 and a left zone of alphabetic keys 420. The navigation initiation zone 470 may also include other navigation-related keys such as a menu key 606 and an escape or back key 608 to facilitate interaction with the device if so desired. The navigation initiation zone 470 may include a plurality of input keys, for example the menu 606, navigation initiation key 474, escape key 608 and other keys. This plurality of input keys within the navigation initiation zone 470 may also have contact-sensitive top surfaces. Additionally, the plurality of input keys can be a physically depressible key with a contact-sensitive top surface. Furthermore, in addition to initiating navigation, the navigation initiation zone 470 may also serve as a wakeup actuator for the cursor navigation area 472 from an energy-saving sleep mode. The functioning of the cursor navigation area 472 is similar to that as described above with the functionality differing in the arrangement of the initiation zone 470 which is vertically arranged rather than horizontally arranged as the initiation zone 70 of FIGS. 1 and 1A. Furthermore, the keys are arranged such that six columns of alphabetic keys are provided. In the illustrated embodiment, the keyboard arrangement is a reduced keyboard arrangement where more than one alphabetic character is presented on at least one key. In other embodiments, the keyboard can be a full keyboard arrangement such that only one alphabetic character is provided on each key. While in yet another embodiment, numeric characters can be provided in addition to the alphabetic characters. The numeric characters can be provided on either the right zone of alphabetic keys 410 or the left zone of alphabetic keys 420. When the keyboard arrangement is a full keyboard arrangement, the numeric characters can be provided on the keys as well. In a preferred embodiment, the numeric characters are arranged in a telephone layout, as described above.

While the navigation initiation zone 70 has generally been illustrated on the front face of the device, it can be similarly situation on other parts of the device. For example the navigation initiation zone can be located on one of the sides of the device or the back of the device. When located on the back of the device, the navigation initiation zone can function very similar to the above described embodiments. However, in at least one embodiment, the functionality of the surrounding navigation area is modified such that cursor navigation is effected on the display screen based upon motion actuation by the operator in the same direction.

In an exemplary embodiment, a computer program will be configured to run on a microprocessor 338 in the handheld electronic communication device 300, and will distinguish between desired cursor navigation or text entry on the handheld electronic communication device 300. The computer program will be programmed to receive data indicative of a sensed sweeping contact motion that is initiated at a navigation initiation zone 70 and which continues across a cursor navigation area 72 on a front face of the device. This cursor navigation area 72 being located coincidentally with at least a portion of a plurality of alphabetic keys on a front face of the device 300, and where the device 300 includes a display screen 322 of the display area 222 located above a keyfield area 650. Furthermore, the microprocessor 338 being communicatively interposed between the cursor navigation area 72 of the keyboard and the display screen 322 of the display area 222 may be further programmed to receive cursor guidance instructions via the cursor navigation area 72, and to cause cursor movement on the display screen 322 of the display area 222 in correspondence with the sensed sweeping contact motion across the cursor navigation area 72. In a further embodiment, the computer program configured to run on a microprocessor 338 in the handheld electronic communication device 300, will be further configured to receive data that is indicative of a sensed initial contact with an alphabetic key 610. Additionally, the microprocessor 338 may be programmed to receive key-selection instructions via the keyfield and be further programmed to cause at least one corresponding letter associated with the contacted key to be displayed on the display screen 322 of the display area 222.

Figure 9:
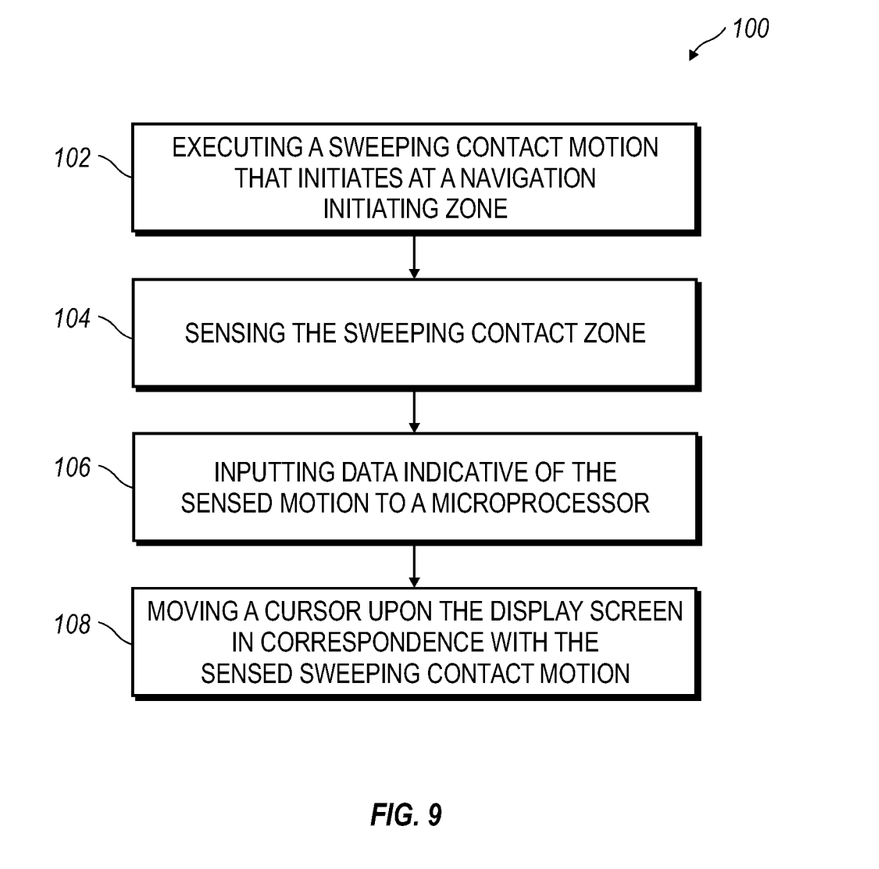
FIG. 9 is a flow chart illustrating an examplary method for on-screen cursor navigation instruction.

In at least one embodiment as illustrated in FIG. 9, a method 100 for executing cursor navigation or text entry on a handheld electronic communication device 300. In the case of cursor navigation, the method first involves a user executing sweeping contact motion initiated at a navigation initiation zone 70 (block 102). This sweeping contact motion continues across a cursor navigation area 72 located coincidentally with at least a portion of a plurality of alphabetic keys on a front face 370 of the device 300, and where the device 300 includes a display screen 322 of the display area 222 located above a keyfield area 650. Additionally, the method senses the sweeping contact motion across the cursor navigation area 72 by one of the above described devices or means or combination thereof (block 104). Data indicative of this sensed motion is inputted to a microprocessor 338 that is communicatively interposed between the cursor navigation area and the display screen 322 of the display area 222 (block 106). The microprocessor 338 is programmed to receive and process this cursor guidance instruction data via the cursor navigation area 72, cause cursor movement on the display screen 322 of the display area 222 in correspondence with the sensed sweeping contact motion that occurs across the cursor navigation area 72 (block 108). In the case of text entry, the method first involves a user executing an initial contact with one of the alphabetic keys of the keyfield. The method then senses this initial contact with one of the alphabetic keys by one of the above described devices, means, or some combination thereof, and data indicative of the contacted key is then inputted to a microprocessor 338 that is communicatively interposed between the keyfield area and the display screen of the display area 322. Then, a microprocessor 338 programmed to receive and process key-selection instructions via the keyfield, will then cause at least one corresponding letter associated with the contacted key to be displayed on the display screen of the display area 322.

Examplary embodiments have been described hereinabove regarding both handheld wireless communication devices 300, as well as the communication networks 319 within which they operate. Again, it should be appreciated that the focus of the present disclosure is providing a navigation initiation zone and an associated cursor navigation area, which are capable of interpreting the input as textual input or cursor navigation input. Various modifications to and departures from the disclosed embodiments will occur to those having skill in the art. The subject matter that is intended to be within the spirit of this disclosure is set forth in the following claims.

What is claimed is:

1. A handheld electronic communication device, comprising:
   a device body having a display area and a keyfield area;
   a microprocessor communicatively interposed between alphabetic keys of the keyfield area and a display screen of the display area, said microprocessor configured to receive text input instructions via the alphabetic keys of the keyfield area and to display corresponding text on the display screen of the display area;
   a cursor navigation area coincidentally, at least a portion of which is located with at least a portion of the alphabetic keys of the keyfield area, said microprocessor communicatively interposed between the cursor navigation area and the display screen and configured to receive cursor guidance instructions via the cursor navigation area and to cause corresponding cursor movement on the display screen; and
   a navigation initiation zone having at least a portion thereof that is exclusive of any of the alphabetic keys and that is fully bounded by the coincidentally located portions of the alphabetic keys and cursor navigation area, the navigation initiation zone further having at least one navigation initiation key dedicated to only initiate a cursor guidance mode of the cursor navigation area, and said microprocessor programmed to render the cursor navigation area operable in response to actuation of the at least one navigation key, and interpret cursor guidance instructions from sweeping contact motion that initiates at the navigation initiation zone after the sweeping contact motion continues across the cursor navigation area and to interpret text input instructions from contact that initiates at an alphabetic key.

2. The handheld electronic communication device as recited in claim 1, wherein the navigation initiation zone comprises a physically depressible key with a contact-sensitive top surface.

3. The handheld electronic communication device as recited in claim 1, wherein the navigation initiation zone comprises a plurality of input keys, each having a contact-sensitive top surface.

4. The handheld electronic communication device as recited in claim 3, wherein at least one of the plurality of input keys is a physically depressible key with a contact-sensitive top surface.

5. The handheld electronic communication device as recited in claim 3, wherein at least one of the plurality of input keys is a menu key.

6. The handheld electronic communication device as recited in claim 3, wherein at least one of the plurality of input keys is a back/escape key.

7. The handheld electronic communication device as recited in claim 1, wherein each of the alphabetic keys is a physically depressible key.

8. The handheld electronic communication device as recited in claim 1, wherein each of the alphabetic keys is a virtual key having a contact-sensitive top surface.

9. The handheld electronic communication device as recited in claim 1, wherein a plurality of the alphabetic keys each have a plurality of letter indicia associated therewith.

10. The handheld electronic communication device as recited in claim 9, wherein the letter indicia associated with the alphabetic keys are arranged in a QWERTY layout.

11. The handheld electronic communication device as recited in claim 1, wherein letter indicia associated with the alphabetic keys are arranged in a QWERTY layout.

12. The handheld electronic communication device as recited in claim 1, wherein letter indicia associated with the alphabetic keys are arranged in a QWERTY layout and the indicia for the letter Q is located above the navigation initiation zone and the indicia for the letter M is located below the navigation initiation zone.

13. The handheld electronic communication device as recited in claim 1, wherein the navigation initiation zone has a tactilely perceptible surface treatment indicative of permissible directions in which cursor guidance can initiate.

14. The handheld electronic communication device as recited in claim 13, wherein the indicated permissible directions that cursor guidance can be initiated are horizontal and vertical.

15. The handheld electronic communication device as recited in claim 13, wherein the indicated permissible directions that cursor guidance can be initiated are horizontal, vertical and diagonal.

16. The handheld electronic communication device as recited in claim 1, wherein the navigation initiation zone is a wakeup actuator for the cursor navigation area from an energy-saving sleep mode.

17. The handheld electronic communication device as recited in claim 1, wherein said keyfield area is located on a front face of the device body.

18. A method for executing cursor navigation or text entry on a handheld electronic communication device, the method comprising:
    detecting actuation of at least one navigation initiation key at a navigation initiation zone, the at least one navigation initiation key dedicated to only initiate a cursor guidance mode of a cursor navigation area on a front face of the device, wherein the front face of the body also includes a display screen located above a keyfield and at least a portion of the cursor navigation area is coincidentally located with at least a portion of a plurality of alphabetic keys of the keyfield relative the front face of the body, and wherein the navigation initiation zone is fully bounded by the portion of the cursor navigation area that is coincidentally located with at least a portion of a plurality of alphabetic keys of the keyfield and has at least a portion thereof that is exclusive of any of the alphabetic keys;
    rendering the cursor navigation area operable in response to the at least one navigation initiation key having been actuated;
    in response to rendering the cursor navigation area operable, detecting sweeping contact motion that initiates at the navigation initiation zone and continues across the cursor navigation area;
    inputting data indicative of the detected motion to a microprocessor communicatively interposed between the cursor navigation area and the display screen, said microprocessor being programmed to receive cursor guidance instructions via the cursor navigation area and to cause corresponding cursor movement on the display screen; and
    moving a cursor upon the display screen in correspondence with the sensed sweeping contact motion across the cursor navigation area.

19. The method of claim 18, further comprising:
    executing an initial contact with one of the alphabetic keys;
    sensing said initial contact with an alphabetic key and inputting data indicative of the contacted key to the microprocessor which is communicatively interposed between the keyfield and the display screen and which is programmed to receive key-selection instructions via the keyfield; and
    causing at least one corresponding letter associated with the contacted key to be displayed on the display screen.

20. A non-transitory computer-readable medium having a computer program stored therein for distinguishing between desired cursor navigation or text entry on a handheld electronic communication device, said program being configured to run on a microprocessor in the handheld electronic communication device and being programmed to:
    detect actuation of at least one navigation initiation key at a navigation initiation zone, the at least one navigation initiation key dedicated to only initiate a cursor guidance mode of a cursor navigation area on a front face of the device, wherein the front face of the body also includes a display screen located above a keyfield and at least a portion of the cursor navigation area is coincidentally located with at least a portion of a plurality of alphabetic keys of the keyfield relative the front face of the body, and wherein the navigation initiation zone is fully bounded by the portion of the cursor navigation area that is coincidentally located with at least a portion of a plurality of alphabetic keys of the keyfield and has at least a portion thereof that is exclusive of any of the alphabetic keys;
    render the cursor navigation area operable in response to the at least one navigation initiation key having been actuated;
    in response to rendering the cursor navigation area operable, detecting sweeping contact motion that initiates at the navigation initiation zone and continues across the cursor navigation area;
    inputting data indicative of the detected motion to a microprocessor communicatively interposed between the cursor navigation area and the display screen, said microprocessor being programmed to receive cursor guidance instructions via the cursor navigation area and to cause corresponding cursor movement on the display screen; and
    moving a cursor upon the display screen in correspondence with the sensed sweeping contact motion across the cursor navigation area.

21. The non-transitory computer-readable medium of claim 20, said program being further configured to receive data that is indicative of a sensed initial contact with an alphabetic key and wherein said microprocessor is communicatively interposed between the keyfield and the display screen and is programmed to receive key-selection instructions via the keyfield; and to cause at least one corresponding letter associated with the contacted key to be displayed on the display screen.

* * * * *